(12) United States Patent
Yoshida et al.

(10) Patent No.: US 9,914,447 B2
(45) Date of Patent: Mar. 13, 2018

(54) CONTROL DEVICE FOR VEHICLE DRIVE APPARATUS

(71) Applicant: AISIN AW CO., LTD., Anjo-shi, Aichi-ken (JP)

(72) Inventors: Takashi Yoshida, Anjo (JP); Kohei Tsuda, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 90 days.

(21) Appl. No.: 14/764,900

(22) PCT Filed: Mar. 17, 2014

(86) PCT No.: PCT/JP2014/057167
§ 371 (c)(1),
(2) Date: Jul. 30, 2015

(87) PCT Pub. No.: WO2014/156774
PCT Pub. Date: Oct. 2, 2014

(65) Prior Publication Data
US 2015/0360673 A1  Dec. 17, 2015

(30) Foreign Application Priority Data

Mar. 27, 2013  (JP) ................. 2013-066937

(51) Int. Cl.
*B60W 20/10* (2016.01)
*B60W 20/40* (2016.01)
(Continued)

(52) U.S. Cl.
CPC ............. *B60W 20/10* (2013.01); *B60K 6/387* (2013.01); *B60K 6/48* (2013.01); *B60L 1/003* (2013.01); *B60L 11/14* (2013.01); *B60L 15/2054* (2013.01); *B60W 10/02* (2013.01); *B60W 10/06* (2013.01); *B60W 10/08* (2013.01); *B60W 10/115* (2013.01); *B60W 10/30* (2013.01);
(Continued)

(58) Field of Classification Search
CPC ....... B60W 20/10; B60W 20/40; B60K 6/387; F16D 48/06; F16D 2048/0245; B60L 15/2054
See application file for complete search history.

(56) References Cited

U.S. PATENT DOCUMENTS 6,175,785 B1   1/2001 Fujisawa et al.
7,730,982 B2 * 6/2010 Hidaka .................... B60K 6/48
                                                         180/292
(Continued)

FOREIGN PATENT DOCUMENTS

JP   H11-348603 A   12/1999
JP   2004-042734 A   2/2004
(Continued)

*Primary Examiner* — Jacob S. Scott
*Assistant Examiner* — Tinh Dang
(74) *Attorney, Agent, or Firm* — Oliff PLC (57) ABSTRACT

A control device for a vehicle drive apparatus, the vehicle drive apparatus including an output shaft connected to an engine; an input shaft connected to a wheel; an electric motor that generates rotational torque of the wheel; and a hydraulic clutch that connects the output shaft to the input shaft when placed in an engaged state, and disconnects the output shaft from the input shaft when placed in a released state.

19 Claims, 8 Drawing Sheets

(51) Int. Cl.
  *B60K 6/387* (2007.10)
  *F16D 48/06* (2006.01)
  *F16D 48/02* (2006.01)
  *B60L 15/20* (2006.01)
  *B60K 6/48* (2007.10)
  *B60L 11/14* (2006.01)
  *B60W 10/02* (2006.01)
  *B60L 1/00* (2006.01)
  *B60W 10/06* (2006.01)
  *B60W 10/115* (2012.01)
  *B60W 10/08* (2006.01)
  *B60W 10/30* (2006.01)

(52) U.S. Cl.
  CPC ............ *B60W 20/40* (2013.01); *F16D 48/06* (2013.01); *B60L 2240/36* (2013.01); *B60L 2240/421* (2013.01); *B60L 2240/441* (2013.01); *B60L 2240/507* (2013.01); *B60W 2710/021* (2013.01); *B60W 2710/0644* (2013.01); *B60W 2710/081* (2013.01); *F16D 2048/0245* (2013.01); *F16D 2500/1066* (2013.01); *F16D 2500/3067* (2013.01); *F16D 2500/30426* (2013.01); *F16D 2500/3166* (2013.01); *Y02T 10/6221* (2013.01); *Y02T 10/645* (2013.01); *Y02T 10/70* (2013.01); *Y02T 10/7077* (2013.01); *Y02T 10/72* (2013.01); *Y02T 10/7275* (2013.01); *Y10S 903/914* (2013.01); *Y10S 903/93* (2013.01); *Y10S 903/946* (2013.01); *Y10T 477/26* (2015.01)

(56) References Cited

U.S. PATENT DOCUMENTS

| | | | | |
|---|---|---|---|---|
| 8,672,805 | B2* | 3/2014 | Akebono | B60W 10/02 477/180 |
| 8,930,051 | B2* | 1/2015 | Kawai | B60K 6/48 192/30 R |
| 9,061,681 | B2* | 6/2015 | Yoshida | B60K 6/48 |
| 9,080,618 | B2* | 7/2015 | Kawakami | F16D 48/02 |
| 9,120,482 | B2* | 9/2015 | Kobayashi | B60K 6/48 |
| 9,175,632 | B2* | 11/2015 | Hirotsu | B60W 10/02 |
| 2004/0007405 | A1 | 1/2004 | Noda et al. | |
| 2012/0059542 | A1 | 3/2012 | Kawai et al. | |
| 2014/0330469 | A1* | 11/2014 | Yoshida | B60W 10/06 701/22 |

FOREIGN PATENT DOCUMENTS

| | | |
|---|---|---|
| JP | 2007-024129 A | 2/2007 |
| JP | 2010-195363 A | 9/2010 |
| JP | 2012-056362 A | 3/2012 |
| JP | 2012-066787 A | 4/2012 |

\* cited by examiner

CONTROL DEVICE FOR VEHICLE DRIVE APPARATUS

BACKGROUND

The present disclosure relates to a control device for a vehicle drive apparatus.

A control device for a hybrid vehicle is known, which includes an engine and a motor as sources of power, a transmission connected to the motor, a clutch installed between the engine and the motor or between the engine and the transmission, and driving wheels connected to the transmission, and which is driven by switching between the engine and the motor or using both the engine and the motor. Such a control device includes a generator connected to an output shaft of the engine and a control unit that uses the generator connected to the output shaft of the engine as a starter motor to start the engine when switching the power from the motor to the engine and engages the clutch when the rotational speed of the motor matches that of the engine (refer to JP H11-348603 A, for example).

SUMMARY

In the structure described in JP H11-348603 A, an engagement command flag for the clutch is output when the torque and the rotational speed of the engine are equal to the torque and the rotational speed of the motor. After the engagement command flag is turned on, a clutch current increases at a constant rate until the engaging force of the clutch reaches maximum value, which increases the engaging force of the clutch. However, a time lag occurs after the engagement command flag for the clutch is output until the engaging force of the clutch is actually generated, so that the time lag may cause racing of engine rotation or a delay in transmission of the engine torque.

Hence, the present disclosure according to an exemplary aspect provides a control device for a vehicle drive apparatus, the control device being capable of reducing the racing of engine rotation and the delay in transmission of the engine torque.

An exemplary aspect of the present disclosure provides a control device for a vehicle drive apparatus, the vehicle drive apparatus including: an output shaft connected to an engine; an input shaft connected to a wheel; an electric motor that generates rotational torque of the wheel; and a hydraulic clutch that connects the output shaft to the input shaft when placed in an engaged state, and disconnects the output shaft from the input shaft when placed in a released state, wherein the hydraulic clutch is a normally-open clutch that establishes the engaged state when oil is supplied thereto, and when requested torque exceeds torque that can be generated by the electric motor while the hydraulic clutch is in the released state, and the input shaft is rotated by the electric motor or by vehicle coasting, the oil starts to be supplied to the hydraulic clutch before a rotational speed of the engine reaches a rotational speed of the input shaft.

Another exemplary aspect of the present disclosure provides a control device for a vehicle drive apparatus, the vehicle drive apparatus including: an output shaft connected to an engine, an input shaft connected to a wheel, an electric motor that generates rotational torque of the wheel, and a hydraulic clutch that connects the output shaft to the input shaft when placed in an engaged state, and disconnects the output shaft from the input shaft when placed in a released state, wherein the hydraulic clutch is a normally-closed clutch that establishes the engaged state when oil is discharged therefrom, and when requested torque exceeds torque that can be generated by the electric motor while the hydraulic clutch is in the released state, and the input shaft is rotated by the electric motor or by vehicle coasting, the oil starts to be discharged from the hydraulic clutch before a rotational speed of the engine reaches a rotational speed of the input shaft.

The present disclosure according to an exemplary aspect provides a control device for a vehicle drive apparatus, the control device being capable of reducing the racing of engine rotation and the delay in transmission of the engine torque.

DETAILED DESCRIPTION OF THE EMBODIMENTS

Embodiments of the present disclosure will be described in detail with reference to the accompanying drawings.

Figure 1:
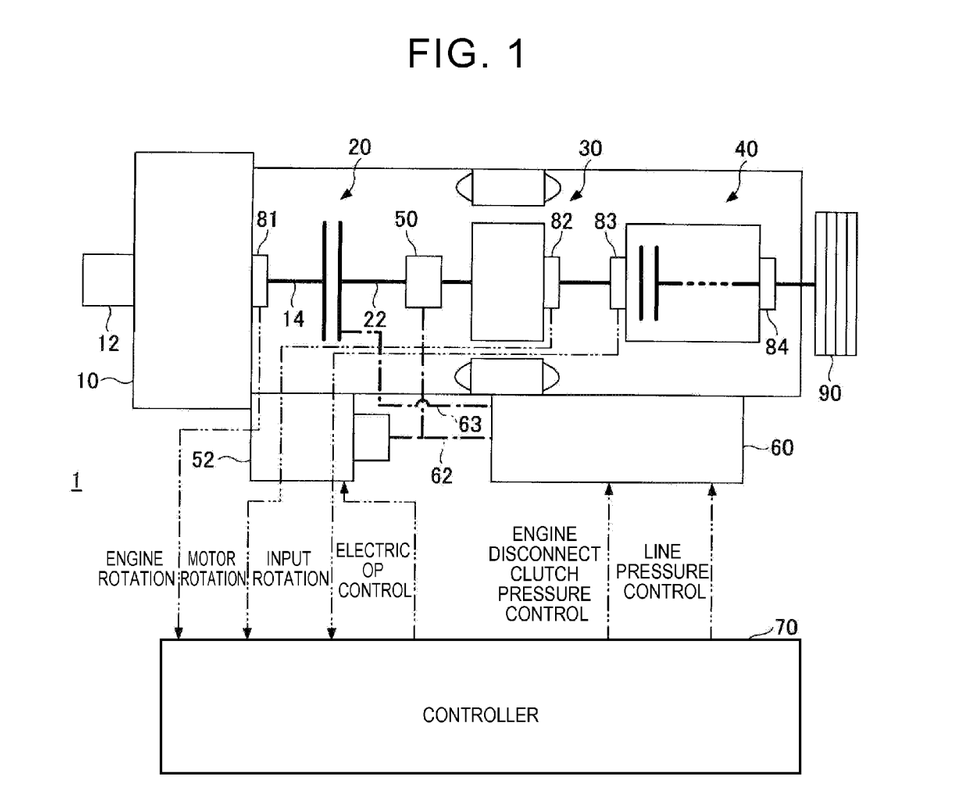
FIG. 1 is a diagram showing an example of a vehicle drive system including an embodiment of a vehicle drive apparatus.

FIG. 1 is a diagram showing an example of a vehicle drive system including an embodiment of a vehicle drive apparatus 1. In FIG. 1, dashed-dotted lines represent hydraulic lines, and chain double-dashed lines represent transmission lines of electric signals. The connections through the transmission lines of electric signals need not be direct connections as shown in FIG. 1, but may be connections through other control units or connections through a bus, such as a controller area network (CAN) bus.

The vehicle drive apparatus 1 includes an input shaft 22, an engine disconnect clutch 20, an electric motor 30, and a controller 70.

The input shaft 22 is connected to an output shaft 14 of an engine 10. The engine 10 is started by a starter 12. An engine rotational speed sensor 81 for detecting an engine rotational speed is provided on the output shaft 14 of the engine 10.

The engine disconnect clutch 20 is constituted by a hydraulic clutch. The hydraulic clutch may have any structure, and, for example, may have a structure in which hydraulic pressure in a piston hydraulic chamber moves and presses a piston onto a friction element to generate a frictional force. The engine disconnect clutch 20 is disposed between the output shaft 14 and the input shaft 22, connecting the output shaft 14 of the engine 10 to the input shaft 22 when placed in an engaged state, and disconnecting the output shaft 14 of the engine 10 from the input shaft 22 when placed in a released state. In the following description, as an example, the engine disconnect clutch 20 is a normally-open clutch. In this case, the engaged state is established by supplying oil to the engine disconnect clutch 20, and the released state is established by discharging the oil therefrom. The engine disconnect clutch 20 may, however, be a normally-closed clutch. In this case, the released state is established by supplying the oil to the engine disconnect clutch 20, and the engaged state is established by discharging the oil therefrom. If the engine disconnect clutch 20 is a normally-closed clutch, the expression, such as "oil 'supplied to' the engine disconnect clutch 20", only needs to be replaced with the expression, "oil 'discharged from' the engine disconnect clutch 20", in the following description. However, if the engine disconnect clutch 20 is a normally-closed clutch, examples shown in FIGS. 5 and 6 need not be applied.

The electric motor 30 is provided so as to apply rotational torque to the input shaft 22. The electric motor 30 may have any structure, and, for example, may be a three-phase permanent magnet motor. A motor position sensor 82 for detecting a motor rotational position is provided on the electric motor 30. The motor position sensor 82 may be, for example, a resolver.

The controller 70 may be constituted by, for example, a microcomputer. The controller 70 performs various types of control (to be described below) based on information from, for example, various sensors 81, 82, 83, and 84. Functions of the controller 70 may be carried out through cooperation of a plurality of control devices.

In the example shown in FIG. 1, the vehicle drive apparatus 1 further includes a transmission 40, an oil pump 50, an electric oil pump 52, and a valve unit 60.

The transmission 40 may have any configuration, and may be, for example, an automatic transmission (AT) or a manual transmission. The transmission 40 may include a stepped speed change mechanism or a stepless speed change mechanism. The stepless speed change mechanism may be of any type, such as a cone ring type. The transmission 40 may be a dual-clutch transmission. The dual-clutch transmission includes, for example, dog clutches similar to those of a manual transmission in two groups of odd-number speeds (such as first, third, and fifth speeds) and even-number speeds (such as second, fourth, and sixth speeds). The transmission 40 includes a turbine rotational speed sensor 83 for detecting a turbine rotational speed (input rotational speed) and an output rotational speed sensor 84 for detecting a rotational speed of an output shaft.

The oil pump 50 is provided so as to operate based on the rotational torque of the input shaft 22. Oil discharged from the oil pump 50 is supplied to the engine disconnect clutch 20 through a hydraulic line 62, the valve unit 60, and a hydraulic line 63. The oil discharged from the oil pump 50 may be used in components other than the engine disconnect clutch 20. In other words, the hydraulic line 62 may be connected to the components (such as clutches and brakes in the transmission 40) other than the engine disconnect clutch 20.

The electric oil pump 52 operates based on rotational torque of a built-in electric motor (not shown). Accordingly, unlike the oil pump 50, the electric oil pump 52 can operate without being affected by a rotational state of the input shaft 22. Oil discharged from the electric oil pump 52 is supplied to the engine disconnect clutch 20 through the hydraulic line 62, the valve unit 60, and the hydraulic line 63. The oil discharged from the electric oil pump 52 may be used in components other than the engine disconnect clutch 20. For example, the oil discharged from the electric oil pump 52 may be used for cooling the clutches in the transmission 40.

The valve unit 60 includes inside thereof a value (not shown) for controlling hydraulic pressure (line pressure) of the hydraulic line 62 and a value (not shown) for controlling hydraulic pressure (hydraulic pressure to be supplied to the engine disconnect clutch 20) of the hydraulic line 63. For example, the line pressure can be controlled by a regulator valve using a linear solenoid. The hydraulic pressure of the engine disconnect clutch 20 may be controlled by controlling a control valve with hydraulic pressure output from the linear solenoid.

In the example shown in FIG. 1, the controller 70 receives the engine rotational speed from the engine rotational speed sensor 81, a motor rotational speed from the motor position sensor 82, and the input rotational speed from the turbine rotational speed sensor 83. Based on these pieces of information, the controller 70 performs control of the electric oil pump 52 (electric OP control), control of the engine disconnect clutch 20 (engine disconnect clutch pressure control), and line pressure control. The controller 70 may perform the engine disconnect clutch pressure control by sending an engine disconnect clutch hydraulic pressure command to the valve unit 60.

In the example shown in FIG. 1, when the engine disconnect clutch 20 is in the engaged state, the rotational torque from both the engine 10 and the electric motor 30 can be transmitted to a wheel 90. In this case, the rotational torque from both the engine 10 and the electric motor 30 may be transmitted to the wheel 90, or the rotational torque from only the engine 10 may be transmitted to the wheel 90, with the electric motor 30 stopped. When the engine disconnect clutch 20 is in the released state, the engine 10 is disconnected, so that the rotational torque from only the electric motor 30 can be transmitted to a wheel 90. The wheel 90 may be a front wheel or a rear wheel.

Figure 2:
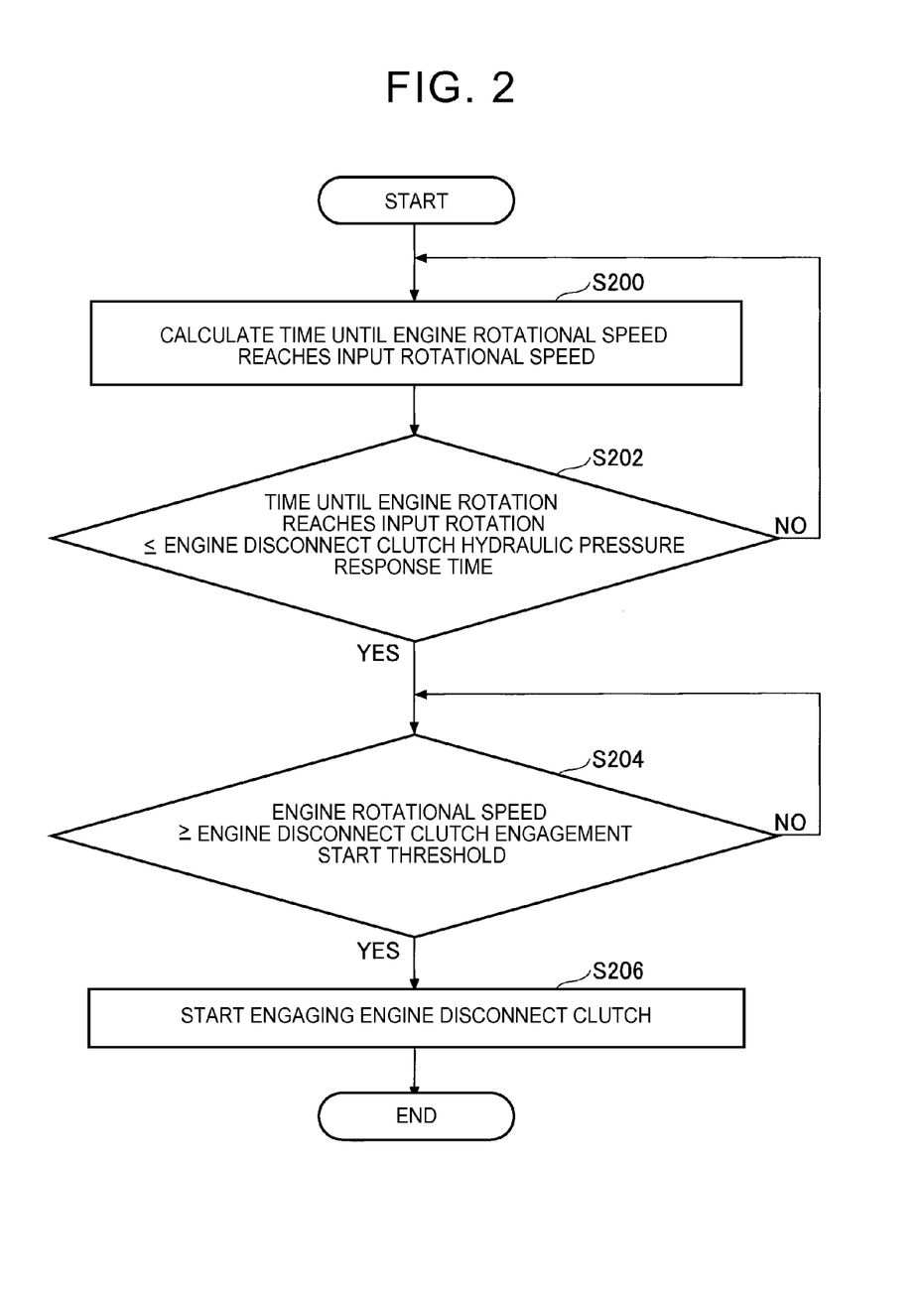
FIG. 2 is a flowchart showing an example of processing executed by a controller.

FIG. 2 is a flowchart showing an example of processing executed by the controller 70. The processing shown in FIG. 2 may start when an engine start command is issued while the engine disconnect clutch 20 is in the released state, the engine 10 is in a stopped state, and the vehicle is in a running state (the input shaft 22 is in a rotating state). The rotating state of the input shaft 22 can typically be established when the electric motor 30 is rotating, but can also be established while the electric motor 30 is not in operation (such as during vehicle coasting).

The engine start command may be issued when requested torque exceeds torque that can be generated by the electric motor 30 alone, due to, for example, an increase in an amount of operation of an accelerator pedal (accelerator operation amount) caused by a driver. The engine start command may be generated by a controller disposed external to the controller 70 or generated in the controller 70. After the engine start command is issued, the starter 12 is driven to start cranking the engine 10, and starting of the engine 10 is initiated.

At Step 200, the controller 70 calculates a time $\Delta T1$ until the engine rotational speed reaches the input rotational speed. In the example shown in FIG. 1, the input rotational speed is equal to the rotational speed of the input shaft 22 (motor rotational speed). The time $\Delta T1$ may be calculated based on the engine rotational speed from the engine rotational speed sensor 81 and the input rotational speed from the turbine rotational speed sensor 83. The motor rotational speed from the motor position sensor 82 may be used instead of the input rotational speed from the turbine rotational speed sensor 83. For example, the time $\Delta T1$ may be calculated as given below.

ΔT1=(input rotational speed−engine rotational speed)/V1

V1=d(input rotational speed−engine rotational speed)/dt

The time ΔT1 may alternatively be calculated as given below.

ΔT1=(input rotational speed−engine rotational speed)/V2

V2=d(engine rotational speed)/dt

At Step 202, the controller 70 determines whether the time ΔT1 is equal to or shorter than an engine disconnect clutch hydraulic pressure response time ΔTth. The engine disconnect clutch hydraulic pressure response time ΔTth refers to a time after a predetermined hydraulic pressure command is issued to the valve unit 60 to engage the clutch until the engine disconnect clutch 20 actually starts engaging (the torque capacity thereof becomes larger than zero). While being allowed to have any value, the predetermined hydraulic pressure command is typically a hydraulic pressure command which minimizes the time until the engine disconnect clutch 20 starts engaging (engine disconnect clutch hydraulic pressure response time ΔTth). The engine disconnect clutch hydraulic pressure response time ΔTth may be set depending on the predetermined hydraulic pressure command. The predetermined hydraulic pressure command may have a command pattern in which the command value thereof does not change with time, or may have a command pattern in which the command value changes with time. Several examples of the predetermined hydraulic pressure command will be described later.

At Step 202, if the time ΔT1 is equal to or shorter than the engine disconnect clutch hydraulic pressure response time ΔTth, the routine proceeds to Step 204, or otherwise, returns to Step 200. If the routine returns to Step 200, the processing from Step 200 starts again in the next processing cycle.

At Step 204, the controller 70 determines, based on the engine rotational speed from the engine rotational speed sensor 81, whether the engine rotational speed is equal to or higher than an engine disconnect clutch engagement start threshold. The engine disconnect clutch engagement start threshold may correspond to the minimum value of the engine rotational speed at which the engine disconnect clutch 20 can start engaging (that is, the minimum value of the rotational speed at which the engine 10 can autonomously rotate). The engine disconnect clutch engagement start threshold may correspond to, for example, an idle speed. If the engine rotational speed is equal to or higher than the engine disconnect clutch engagement start threshold, the routine proceeds to Step 206, or otherwise, stays in a waiting state. In all other cases, the routine may return to Step 200.

At Step 206, the controller 70 performs engagement start processing of the engine disconnect clutch 20. The engagement start processing of the engine disconnect clutch 20 may be performed by sending the predetermined hydraulic pressure command as the engine disconnect clutch hydraulic pressure command to the valve unit 60. In response to the predetermined hydraulic pressure command, the valve unit 60 supplies the oil to the engine disconnect clutch 20.

In the processing shown in FIG. 2, the engagement start processing of the engine disconnect clutch 20 is performed from the time when the time ΔT1 until the engine rotational speed reaches the input rotational speed is determined to be equal to or shorter than the engine disconnect clutch hydraulic pressure response time ΔTth. In other words, the engagement start processing of the engine disconnect clutch 20 is started in advance by taking a delay in response of the engine disconnect clutch 20 into account. This operation allows the engine disconnect clutch 20 to start engaging (to set the torque capacity to a value larger than zero) in synchronization with the time at which the engine rotational speed reaches the input rotational speed.

Figure 3:
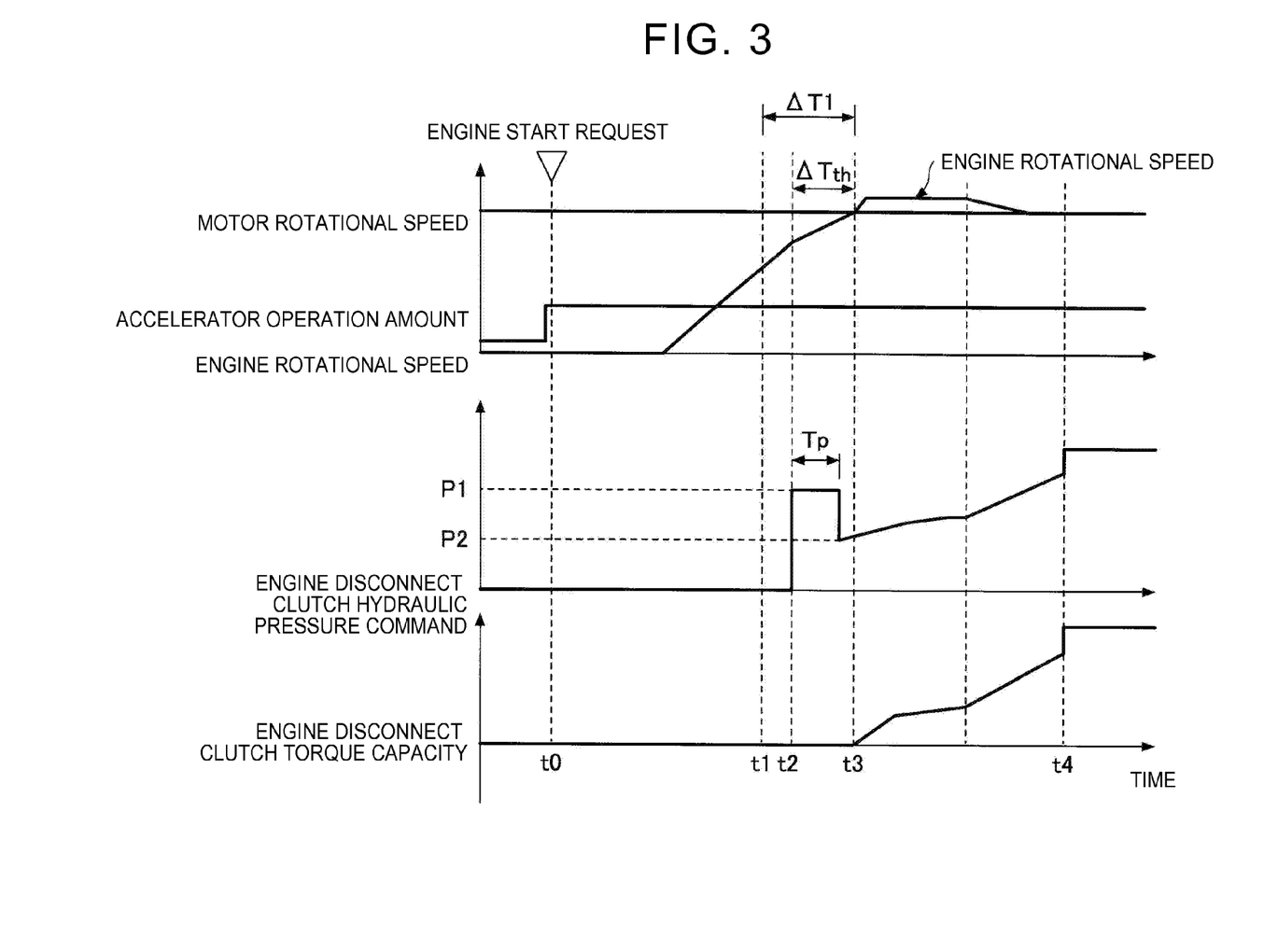
FIG. 3 is a diagram showing an example of a predetermined hydraulic pressure command.

FIG. 3 is a timing diagram for explaining the processing of FIG. 2, and is a diagram showing an example of the predetermined hydraulic pressure command. FIG. 3 shows, from the top downward, a time-series plot of the motor rotational speed (input rotational speed), time-series plots of the accelerator operation amount and the engine rotational speed, a time-series plot of the engine disconnect clutch hydraulic pressure command, and a time-series plot of the engine disconnect clutch torque capacity (actual value).

In the example shown in FIG. 3, while the engine disconnect clutch 20 is in the released state, the engine 10 is in the stopped state, and the vehicle is in the running state (the input shaft 22 is in the rotating state), the accelerator operation amount increases immediately before time t0, and accordingly, an engine start request is issued at time t0. This request causes the starter 12 to initiate starting of the engine 10, and the engine rotational speed gradually increases. During this period, in the example shown in FIG. 3, the motor rotational speed is kept constant for the sake of convenience. However, the motor rotational speed can vary. The issuance of the engine start command starts the processing of FIG. 2, and the time ΔT1 until the engine rotational speed reaches the input rotational speed is calculated at predetermined intervals of time. For example, a time ΔT calculated at time t1 is longer than the engine disconnect clutch hydraulic pressure response time ΔTth, so that the engine disconnect clutch hydraulic pressure command remains zero. Thereafter, the time ΔT calculated at time t2 results in the engine disconnect clutch hydraulic pressure response time ΔTth or shorter, so that the predetermined hydraulic pressure command is issued as the engine disconnect clutch hydraulic pressure command at time t2. In the example shown in FIG. 3, the predetermined hydraulic pressure command has a command pattern during the time ΔT1 from time t2. Specifically, the predetermined hydraulic pressure command has a command pattern that rises from a command value of zero to a command value P1, remains at the command value P1 for a certain time Tp, then decreases to a command value P2, and then gradually increases. For example, the command value P1 is a command value for fully filling (initially filling) the piston hydraulic chamber of the engine disconnect clutch 20 with the oil in a short time (time Tp), and the command value P2 is a command value corresponding to a desired hydraulic pressure increasing gradient (torque capacity increasing gradient) when the engine disconnect clutch 20 starts engaging. In other words, the command value P1 establishes a state immediately before starting the engagement of the engine disconnect clutch 20 (state capable of starting the engagement in the shortest time), and the command value P2 or a command value thereafter starts the engagement of the engine disconnect clutch 20.

As a result, as shown in FIG. 3, the torque capacity of the engine disconnect clutch 20 exceeds zero (the engagement starts) at time t3 after a lapse of the engine disconnect clutch hydraulic pressure response time ΔTth from time t2. At time t3 after the lapse of the time ΔT from time t2, the engine rotational speed substantially reaches the input rotational speed, as shown in FIG. 3. That is, the torque capacity of the engine disconnect clutch 20 exceeds zero when the engine rotational speed reaches the input rotational speed. This operation can reduce inconvenience (such as engine racing and a delay in transmission of the torque) that occurs when the torque capacity of the engine disconnect clutch 20 still remains zero after the engine rotational speed reaches the input rotational speed. This operation can also reduce inconvenience (such as a shock generated by a rotation difference) that occurs when the torque capacity of the engine disconnect clutch 20 exceeds zero before the engine rotational speed reaches the input rotational speed.

In the example shown in FIG. 3, at time t4 after time t3, the torque capacity reaches a predetermined value, and the engine disconnect clutch 20 is fully engaged (the engaged state is established).

In the example shown in FIGS. 2 and 3, the engine disconnect clutch hydraulic pressure response time ΔTth may be constant, or may be variable with oil temperature. This is because the response is better as the oil temperature is higher. In this case, the engine disconnect clutch hydraulic pressure response time ΔTth may be variable in a manner to be reduced as the oil temperature increases. An oil temperature sensor (not shown) may detect the oil temperature. Alternatively, the predetermined hydraulic pressure command may be variable with the oil temperature. In this case, for example, the predetermined hydraulic pressure command may be variable with the oil temperature so that the engine disconnect clutch hydraulic pressure response time ΔTth results in a fixed value.

Figure 4:
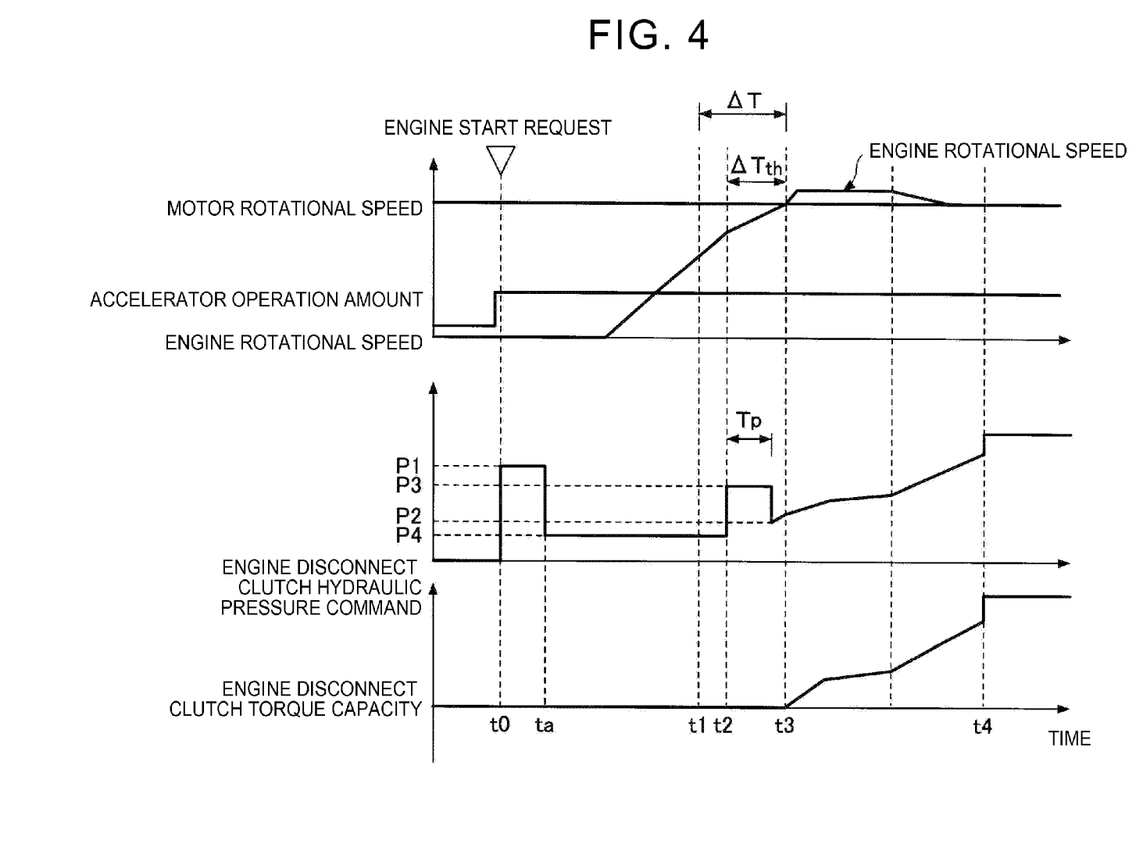
FIG. 4 is a diagram showing another example of the predetermined hydraulic pressure command.

FIG. 4 is a diagram showing another example of the predetermined hydraulic pressure command, and is a timing diagram similar to FIG. 3. FIG. 4 shows, from the top downward, a time-series plot of the motor rotational speed (input rotational speed), time-series plots of the accelerator operation amount and the engine rotational speed, a time-series plot of the engine disconnect clutch hydraulic pressure command, and a time-series plot of the engine disconnect clutch torque capacity (actual value).

In the example shown in FIG. 4, the engine disconnect clutch hydraulic pressure command rises from the command value of zero to the command value P1 at time t0 (when the engine start request occurs), then decreases to a command value P4 at time ta, and remains at the command value P4. In the same manner as described above, the command value P1 is a command value for relatively quickly filling the piston hydraulic chamber of the engine disconnect clutch 20 with the oil, and the command value P4 is a command value for slowly filling the piston hydraulic chamber of the engine disconnect clutch 20 with the oil. In this manner, in the example shown in FIG. 4, the oil is supplied to the piston hydraulic chamber of the engine disconnect clutch 20 before the time ΔT1 is determined to be equal to or shorter than the engine disconnect clutch hydraulic pressure response time ΔTth after the engine start request is issued. Then, when the time ΔT1 is determined to be equal to or shorter than the engine disconnect clutch hydraulic pressure response time ΔTth at time t2, the predetermined hydraulic pressure command is issued as the engine disconnect clutch hydraulic pressure command, in the same manner as described above. In the example shown in FIG. 4, the predetermined hydraulic pressure command has a command pattern during the time ΔT1 from time t2. Specifically, the predetermined hydraulic pressure command has a command pattern that rises from the command value of zero to a command value P3, remains at the command value P3, then decreases to the command value P2, and then gradually increases. For example, the command value P3 is a command value for fully filling the piston hydraulic chamber of the engine disconnect clutch 20 with the oil in a short time (time Tp), and the command value P2 is a command value corresponding to a desired hydraulic pressure increasing gradient (torque capacity increasing gradient) when the engine disconnect clutch 20 starts engaging. In other words, the command value P3 establishes the state immediately before starting the engagement of the engine disconnect clutch 20 (state capable of starting the engagement in the shortest time), and the command value P2 or a command value thereafter starts the engagement of the engine disconnect clutch 20. The command value P3 is smaller than the command value P1 shown in FIG. 3. This is because, in the example shown in FIG. 4, the oil is supplied to the piston hydraulic chamber of the engine disconnect clutch 20 before the time ΔT1 is determined to be equal to or shorter than the engine disconnect clutch hydraulic pressure response time ΔTth, so that a smaller amount of the oil is needed to complete the filling.

In this manner, the engine disconnect clutch hydraulic pressure command need not exceed zero from the time when the time ΔT1 is determined to be equal to or shorter than the engine disconnect clutch hydraulic pressure response time ΔTth. In other words, the engine disconnect clutch hydraulic pressure command may exceed zero before the time ΔT1 is determined to be equal to or shorter than the engine disconnect clutch hydraulic pressure response time ΔTth. The predetermined hydraulic pressure command issued from the time when the time ΔT1 is determined to be equal to or shorter than the engine disconnect clutch hydraulic pressure response time ΔTth may be changed, where appropriate, according to the pattern of the engine disconnect clutch hydraulic pressure command before the time ΔT1 is determined to be equal to or shorter than the engine disconnect clutch hydraulic pressure response time ΔTth. A plurality of such predetermined hydraulic pressure commands may be prepared.

In the example shown in FIG. 4, before the time ΔT1 is determined to be equal to or shorter than the engine disconnect clutch hydraulic pressure response time ΔTth, the engine disconnect clutch hydraulic pressure command rises from zero to the command value P1, then decreases to the command value P4, and remains at the command value P4. However, any pattern may be used for the engine disconnect clutch hydraulic pressure command before the time ΔT1 is determined to be equal to or shorter than the engine disconnect clutch hydraulic pressure response time ΔTth. The engine disconnect clutch hydraulic pressure command before the time ΔT1 is determined to be equal to or shorter than the engine disconnect clutch hydraulic pressure response time ΔTth only needs to be appropriately determined from the viewpoint of reducing the engine disconnect clutch hydraulic pressure response time ΔTth.

The examples shown in FIGS. 3 and 4 assume that the line pressure is high enough to achieve the engine disconnect clutch hydraulic pressure response time ΔTth after the predetermined hydraulic pressure command is issued. If, however, the line pressure is not high enough, the engine disconnect clutch hydraulic pressure response time ΔTth may not be achieved (the actual engine disconnect clutch hydraulic pressure response time may be longer than ΔTth) after the predetermined hydraulic pressure command is issued. Hence, the engine disconnect clutch hydraulic pressure response time ΔTth (or the predetermined hydraulic pressure command) may be variable with the line pressure. However, by increasing the line pressure in advance, the engine disconnect clutch hydraulic pressure response time $\Delta$Tth can be achieved after the predetermined hydraulic pressure command is issued.

Next, a structure for controlling the line pressure in advance will be described with reference to FIGS. 5 and 6. As described above, the line pressure is source pressure for generating the hydraulic pressure to be supplied to the engine disconnect clutch 20, and the hydraulic pressure obtained by regulating the line pressure is supplied to the engine disconnect clutch 20.

Figure 5:
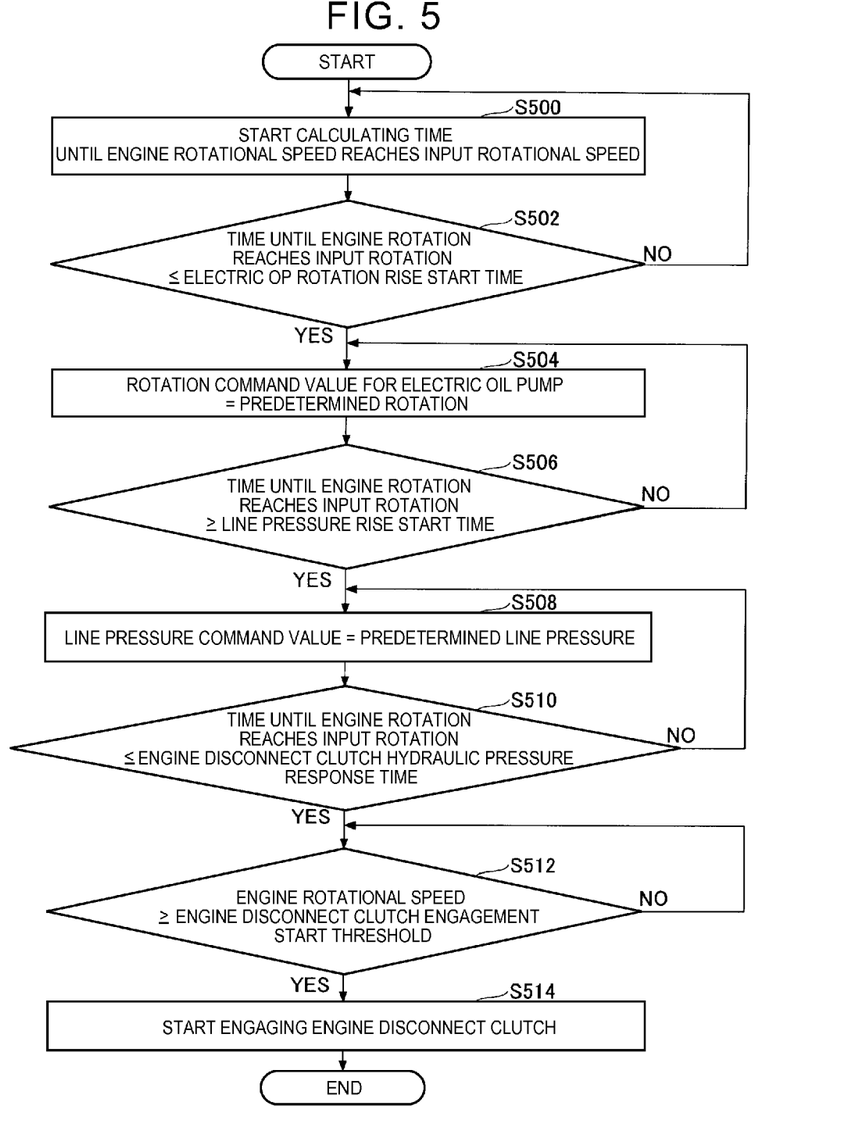
FIG. 5 is a flowchart showing another example of the processing executed by the controller.

FIG. 5 is a flowchart showing another example of the processing executed by the controller 70. In the same manner as the processing shown in FIG. 2, the processing shown in FIG. 5 may start when the engine start command is issued while the engine disconnect clutch 20 is in the released state, the engine 10 is in the stopped state, and the vehicle is in the running state (the input shaft 22 is in the rotating state).

Processing at each of Steps 500, 510, 512, and 514 may be the same as the processing at each of Steps 200, 202, 204, and 206, shown in FIG. 2, and thus, description thereof is omitted.

At Step 502, the controller 70 determines whether the time $\Delta$T1 (time $\Delta$T1 until the engine rotational speed reaches the input rotational speed) is equal to or shorter than an electric OP rotation rise start time $\Delta$T2. The electric OP rotation rise start time $\Delta$T2 corresponds to a time after a predetermined rotation command value Rop is issued until the rotational speed of the electric oil pump 52 reaches the predetermined rotation command value Rop. The predetermined rotation command value Rop corresponds to the rotational speed of the electric oil pump 52 that achieves the engine disconnect clutch hydraulic pressure response time $\Delta$Tth after the predetermined hydraulic pressure command is issued. Accordingly, the predetermined rotation command value Rop corresponds to a rotational speed allowing the piston hydraulic chamber to be initially filled with the oil in a manner in which a pressure drop is not caused in the piston hydraulic chamber. The electric OP rotation rise start time $\Delta$T2 may be a fixed value adapted based on, for example, a test or an analysis. The electric OP rotation rise start time $\Delta$T2 may alternatively be variable with the oil temperature. In this case, the electric OP rotation rise start time $\Delta$T2 may be variable in a manner to be reduced as the oil temperature increases. In either case, the electric OP rotation rise start time $\Delta$T2 has typically a value larger than the engine disconnect clutch hydraulic pressure response time $\Delta$Tth. If the time $\Delta$T1 is equal to or shorter than the electric OP rotation rise start time $\Delta$T2, the routine proceeds to Step 504, or otherwise, returns to Step 500. If the routine returns to Step 500, the processing from Step 500 starts again in the next processing cycle.

At Step 504, a rotation command value for the electric oil pump 52 is set to the predetermined rotation command value Rop. That is, the predetermined rotation command value Rop is issued to the electric oil pump 52. In response, the rotational speed of the electric oil pump 52 increases to the predetermined rotation command value Rop. The rotation command value for the electric oil pump 52 may be the maximum value of request values from other components (such as the clutches of the transmission 40) supplied with hydraulic pressure from the line pressure. Accordingly, if a request value from another component is larger than the predetermined rotation command value Rop, the rotation command value for the electric oil pump 52 is set to the request value from the other component.

At Step 506, the controller 70 determines whether the time $\Delta$T1 (time $\Delta$T1 until the engine rotational speed reaches the input rotational speed) is equal to or shorter than a line pressure rise start time $\Delta$T3. The line pressure rise start time $\Delta$T3 corresponds to a time after a predetermined line pressure command value $P_L$ is issued until the line pressure reaches the predetermined line pressure command value $P_L$ under the condition in which the rotational speed of the electric oil pump 52 is increasing to the predetermined rotation command value Rop as described above. The line pressure rise start time $\Delta$T3 is shorter than the electric OP rotation rise start time $\Delta$T2. Accordingly, if the rotational speed of the electric oil pump 52 reaches the predetermined rotation command value Rop at the same time as the line pressure reaches the predetermined line pressure command value $P_L$, the line pressure rise start time $\Delta$T3 corresponds to a time after the predetermined line pressure command value $P_L$ is issued until the line pressure reaches the predetermined line pressure command value $P_L$ under the condition in which the rotational speed of the electric oil pump 52 has started increasing to the predetermined rotation command value Rop, as described above, a certain time (=$\Delta$T2−$\Delta$T3) before. The predetermined line pressure command value $P_L$ corresponds to the line pressure that achieves the engine disconnect clutch hydraulic pressure response time $\Delta$Tth after the predetermined hydraulic pressure command is issued. Accordingly, the predetermined line pressure command value $P_L$ corresponds to line pressure allowing the piston hydraulic chamber of the engine disconnect clutch 20 to be initially filled with the oil in a manner in which a pressure drop is not caused in the piston hydraulic chamber. The line pressure rise start time $\Delta$T3 may be a fixed value adapted based on, for example, a test or an analysis. The line pressure rise start time $\Delta$T3 may alternatively be variable with the oil temperature. In this case, the line pressure rise start time $\Delta$T3 may be variable in a manner to be reduced as the oil temperature increases. If the time $\Delta$T1 is equal to or shorter than the line pressure rise start time $\Delta$T3, the routine proceeds to Step 508, or otherwise, returns to Step 504, and the processing at Step 504 is continued. If the routine returns to Step 504, the time $\Delta$T1 is calculated anew in the next processing cycle, and used at Step 506.

At Step 508, a line pressure command value is set to the predetermined line pressure command value $P_L$. That is, the line pressure increases to the predetermined line pressure command value $P_L$. After the processing at Step 508 ends, the routine proceeds to Step 510. If the result at Step 510 is determined to be negative and the routine returns to Step 508, the time $\Delta$T1 is calculated anew in the next processing cycle, and used at Step 510.

In the processing shown in FIG. 5, even if the line pressure is insufficient when the engine start request occurs, the electric oil pump 52 is driven in advance to increase the line pressure, so that the engine disconnect clutch hydraulic pressure response time $\Delta$Tth is achieved when the predetermined hydraulic pressure command is issued. This operation allows the engine disconnect clutch 20 to start to have the torque capacity when the engine rotational speed reaches the input rotational speed, even if the line pressure is insufficient when the engine start request occurs.

In the processing shown in FIG. 5, if, when the processing shown in FIG. 5 starts (that is, when the engine start request occurs), the line pressure has already reached the predetermined line pressure command value $P_L$, for example, due to driving of the oil pump 50, the processing at Steps 502 to 508 may be omitted. From the same point of view, the line pressure rise start time $\Delta$T3 may be variable with the line pressure at that moment. For example, the line pressure rise start time ΔT3 may be variable in a manner to be reduced as the line pressure at that moment is closer to the predetermined line pressure command value $P_L$. The predetermined rotation command value Rop (and the electric OP rotation rise start time ΔT2) for the electric oil pump 52 may be variable with the line pressure at that moment.

Figure 6:
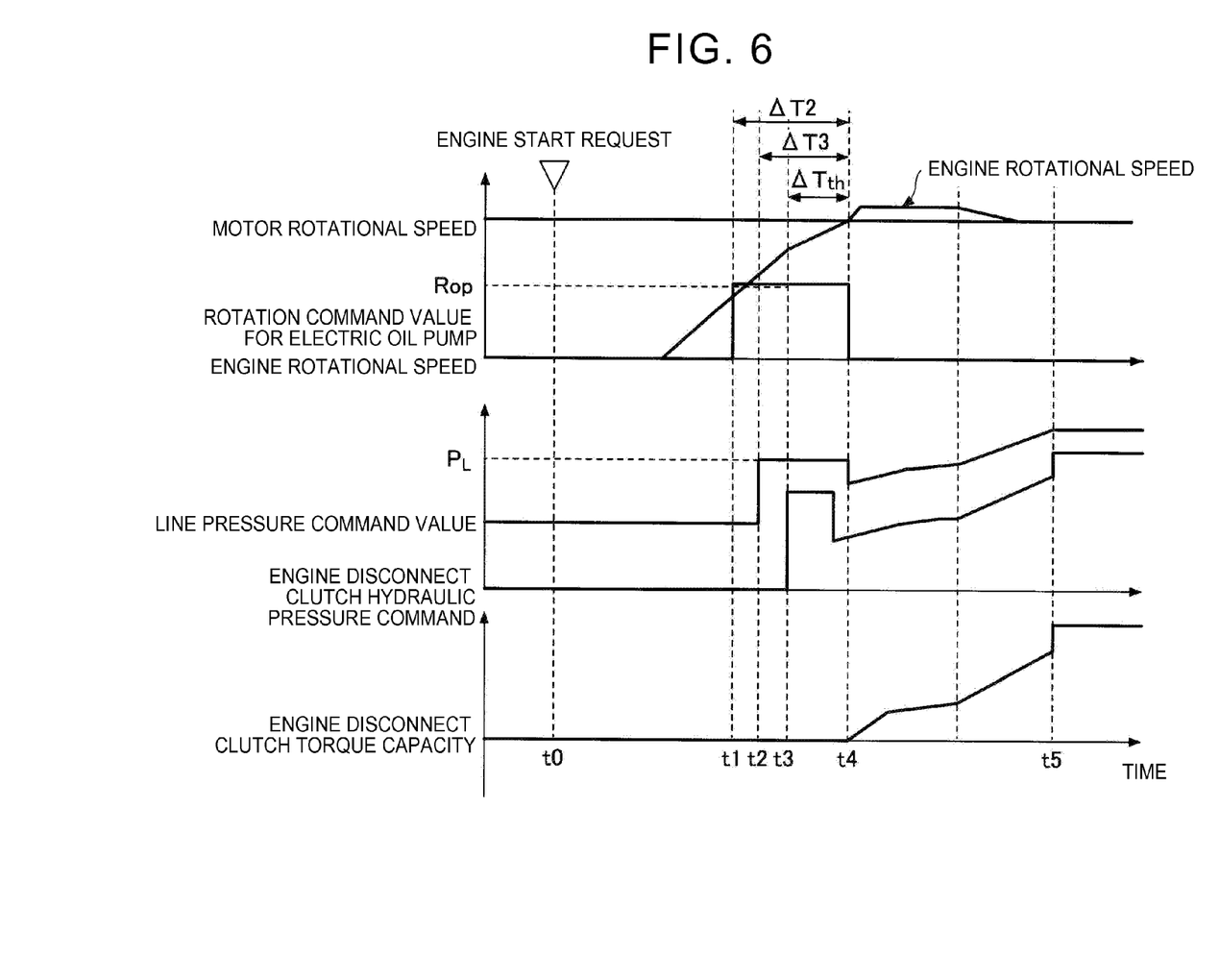
FIG. 6 is a timing diagram for explaining the processing of FIG. 5.

FIG. 6 is a timing diagram for explaining the processing of FIG. 5. FIG. 6 shows, from the top downward, a time-series plot of the motor rotational speed (input rotational speed), time-series plots of the rotation command value for the electric oil pump 52 and the engine rotational speed, a time-series plot of the line pressure command value, a time-series plot of the engine disconnect clutch hydraulic pressure command, and a time-series plot of the engine disconnect clutch torque capacity (actual value). The example shown in FIG. 6 assumes that the electric OP rotation rise start time ΔT2>the line pressure rise start time ΔT3>the engine disconnect clutch hydraulic pressure response time ΔTth.

In the example shown in FIG. 6, while the engine disconnect clutch 20 is in the released state, the engine 10 is in the stopped state, and the vehicle is in the running state (the input shaft 22 is in the rotating state), the accelerator operation amount increases immediately before time t0, and accordingly, the engine start request is issued at time t0. This request causes the starter 12 to initiate the starting of the engine 10, and the engine rotational speed gradually increases. During this period, in the example shown in FIG. 6, the motor rotational speed is kept constant for the sake of convenience. However, the motor rotational speed can vary. After the engine start command is issued, the processing of FIG. 5 is started, and the time ΔT1 until the engine rotational speed reaches the input rotational speed is calculated at predetermined intervals of time.

At time t1, the time ΔT1 is determined to be equal to or shorter than the electric OP rotation rise start time ΔT2, and the rotation command value for the electric oil pump 52 rises to the predetermined rotation command value Rop. The rotation command value that rose to the predetermined rotation command value Rop at time t1 is then kept at the predetermined rotation command value Rop until time t4 at which the engine disconnect clutch 20 starts engaging. At time t2 thereafter, the time ΔT1 is determined to be equal to or shorter than the line pressure rise start time ΔT3, and the line pressure command value rises to the predetermined line pressure command value $P_L$. In the same manner, the line pressure command value that rose to the predetermined line pressure command value $P_L$ at time t2 is then kept at the predetermined line pressure command value $P_L$ until time t4 at which the engine disconnect clutch 20 starts engaging. At time t3 thereafter, the time ΔT is determined to be equal to or shorter than the engine disconnect clutch hydraulic pressure response time ΔTth, and the predetermined hydraulic pressure command is issued as the engine disconnect clutch hydraulic pressure command. As a result, as shown in FIG. 6, the torque capacity of the engine disconnect clutch 20 exceeds zero (the engagement starts) at time t4 after a lapse of the engine disconnect clutch hydraulic pressure response time ΔTth from time t3. At time t4 after the lapse of the time ΔT from time t3, the engine rotational speed substantially reaches the input rotational speed, as shown in FIG. 6. That is, the torque capacity of the engine disconnect clutch 20 exceeds zero when the engine rotational speed reaches the input rotational speed. This operation can reduce inconvenience and the like that occur when the torque capacity of the engine disconnect clutch 20 still remains zero after the engine rotational speed reaches the input rotational speed. In the example shown in FIG. 6, at time t5 thereafter, the torque capacity reaches the predetermined value, and the engine disconnect clutch 20 is fully engaged.

In the example shown in FIG. 6, the rotation command value for the electric oil pump 52 rises to the predetermined rotation command value Rop, and then remains at the predetermined rotation command value Rop. The rotation command value may, however, have a command value pattern varying with time. In the same manner, the line pressure command value may have a command value pattern varying with time.

The present embodiment described above provides, in particular, an excellent effect as described below.

As given above, a rate of change V1 in differential rotation of the engine disconnect clutch 20 is calculated, and, based on the calculated rate of change V1 in differential rotation, a timing is predicted at which the engine rotational speed will exceed the input rotational speed. The engagement start processing of the engine disconnect clutch 20 is started at a timing obtained by subtracting the engine disconnect clutch hydraulic pressure response time ΔTth from the predicted time. This operation allows the engine disconnect clutch 20 to start to have the torque capacity when the engine rotational speed reaches the input rotational speed. The timing when the engine rotational speed reaches the input rotational speed is ideally exactly the same as the timing when the engine disconnect clutch 20 starts to have the torque capacity. However, a certain extent of deviation is actually produced by a prediction error or the like, and such a deviation is allowed as long as this does not affect the practical effect.

Figure 7:
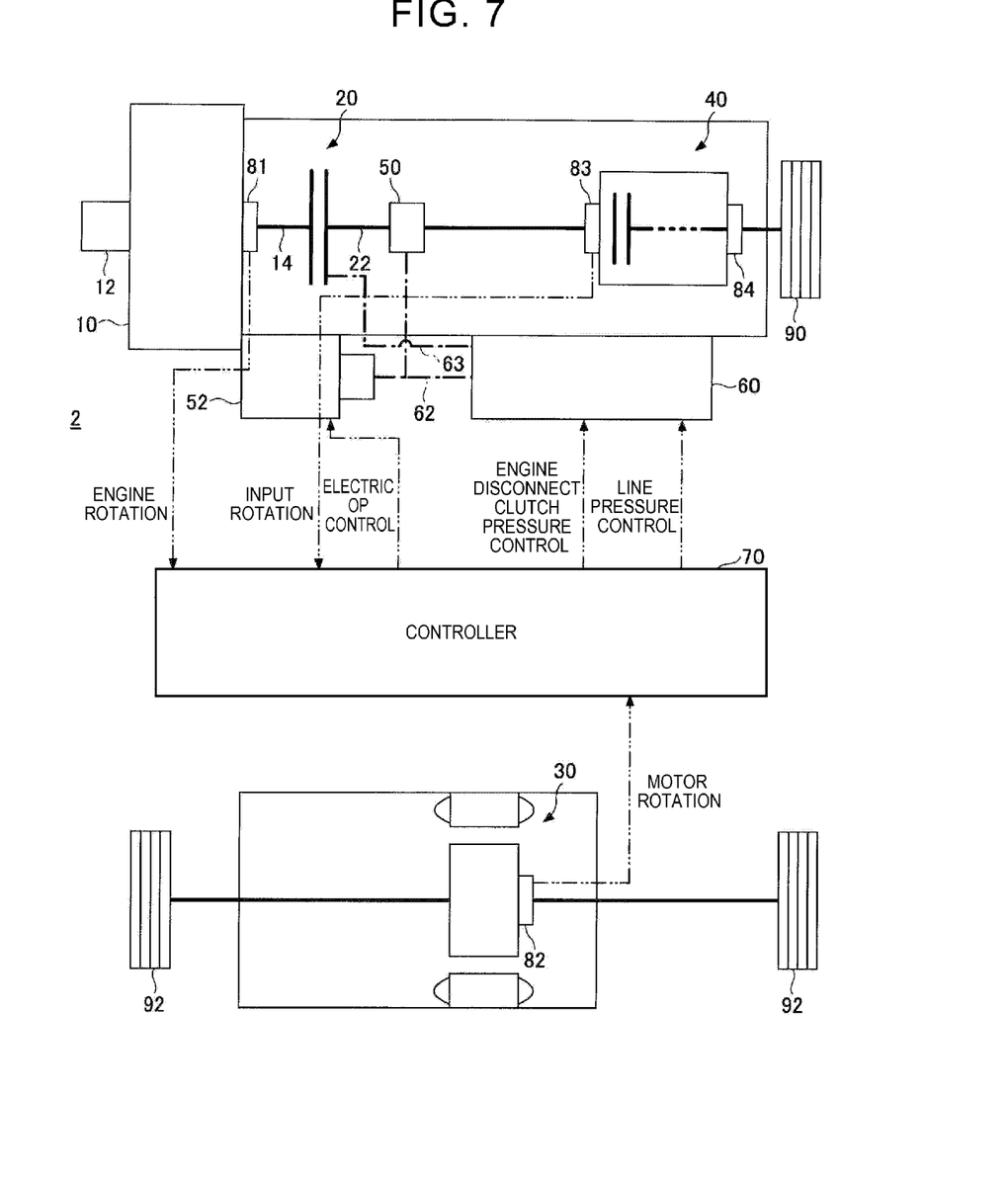
FIG. 7 is a diagram showing an example of a vehicle drive system including a vehicle drive apparatus of another embodiment.

FIG. 7 is a diagram showing an example of a vehicle drive system including a vehicle drive apparatus 2 of another embodiment. In the embodiment shown in FIG. 7, the wheel 90 is the front wheel, and the input shaft 22 is provided on the front wheel side. The electric motor 30 is provided at rear wheels 92. Specifically, the electric motor 30 is provided so as to directly apply the rotational torque to drive shafts of the rear wheels 92. Also in this case, in the same manner as described above, the same control as that described above only needs to be performed when the engine start command is issued while the engine disconnect clutch 20 is in the released state, the engine 10 is in the stopped state, and the vehicle is in the running state (the input shaft 22 is in the rotating state). Also in this case, in the same manner as described above, the rotating state of the input shaft 22 can typically be established when the electric motor 30 is rotating, but can also be established while the electric motor 30 is not in operation (such as during vehicle coasting).

Figure 8:
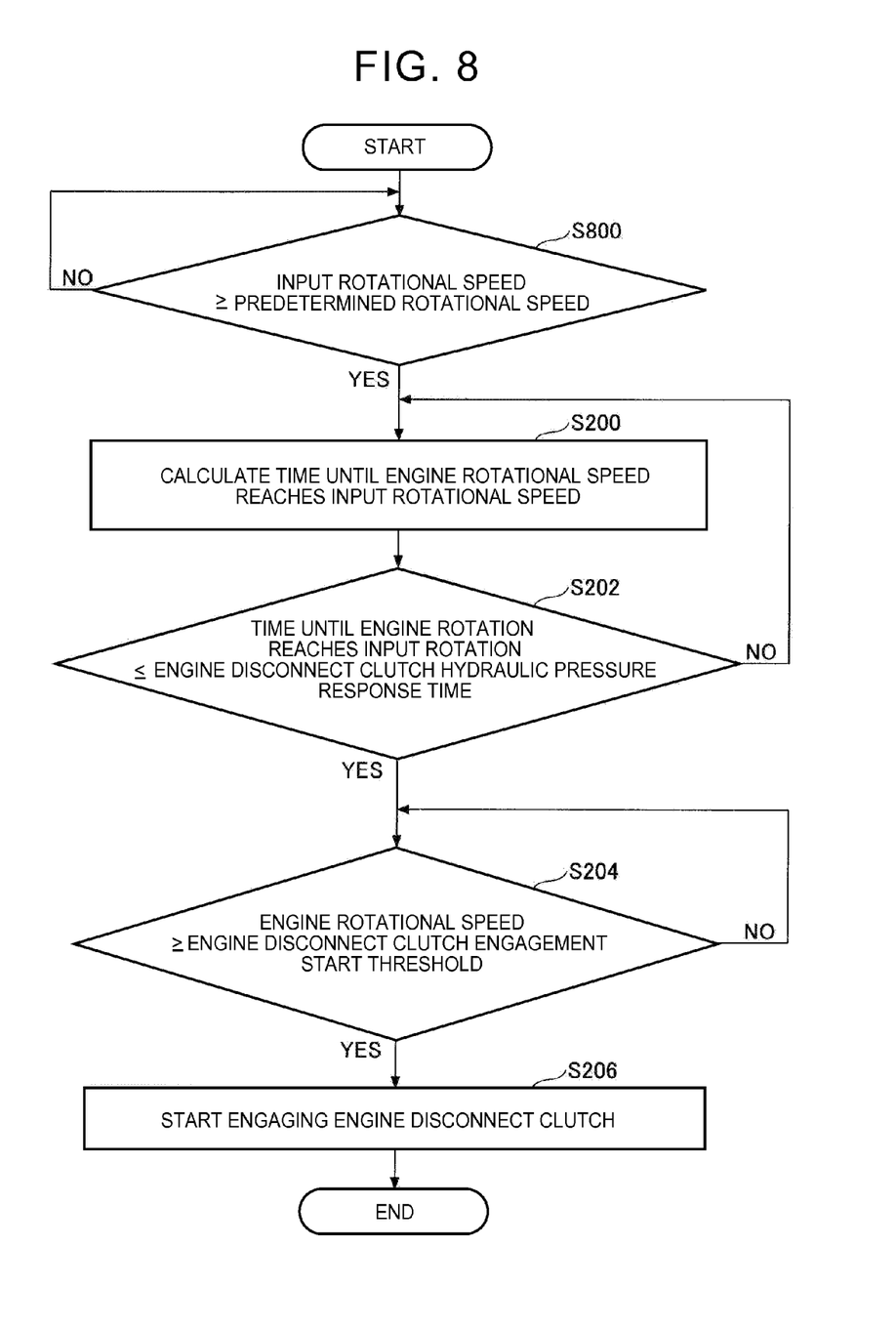
FIG. 8 is a flowchart showing still another example of the processing executed by the controller.

FIG. 8 is a flowchart showing still another example of the processing executed by the controller 70.

The processing shown in FIG. 8 differs from the processing shown in FIG. 3 only in that Step 800 is added. The following description will focus on differences from the processing shown in FIG. 3.

At Step 800, the controller 70 determines whether the input rotational speed is equal to or higher than a predetermined rotational speed. The predetermined rotational speed may be the minimum value of the rotational speed at which the engine 10 can autonomously rotate, or a rotational speed slightly above the minimum value. If the input rotational speed is equal to or higher than the predetermined rotational speed, the routine proceeds to Step 200, or otherwise, stays in a state of waiting until the input rotational speed reaches the predetermined rotational speed or above.

In the processing shown in FIG. 8, execution of the processing at Step 206 can be prevented under a condition in which the input rotational speed is lower than the predetermined rotational speed. Under the condition in which the input rotational speed is lower than the predetermined rotational speed, execution of the processing at Step 206 may stop the engine 10 (may cause what is called an engine stall). The processing shown in FIG. 8 can prevent such an inconvenience.

In the processing shown in FIG. 8, with the addition of the processing at Step 800, the processing at Step 204 may be omitted.

The processing shown in FIG. 8 may be combined with the processing shown in FIG. 5. Specifically, the processing at Step 800 may be performed before Step 500 shown in FIG. 5. In this case, if the input rotational speed is equal to or higher than the predetermined rotational speed, the routine proceeds to Step 500, or otherwise, stays in the state of waiting until the input rotational speed reaches the predetermined rotational speed or above.

While the embodiments have been described in detail, the present disclosure is not limited to the particular embodiments. Further, all or more than one of the components of the embodiments described above can be combined.

For example, the above-described embodiments include, as preferable embodiments, the oil pump 50 and the electric oil pump 52. Embodiments may, however, have a structure including only the oil pump 50 or the electric oil pump 52.

The structure shown in FIG. 1 can be variously modified. For example, the electric motor 30 can be positioned anywhere, and components, such as a reduction gear, may be added.

In the example above, the case in which the engine 10 is connected to the front wheel has been described. However, the engine 10 may be connected to the rear wheels.

The present international application claims priority under Japanese Patent Application No. 2013-066937 filed on Mar. 27, 2003, and the present international application incorporates the contents thereof by reference in their entirety.

The following are further disclosed with respect to the embodiments described above.

(1) A controller 70 for a vehicle drive apparatus 1 or 2, the vehicle drive apparatus 1 or 2 including:

an output shaft 14 connected to an engine 10,
an input shaft 22 connected to a wheel 90,
an electric motor 30 that generates rotational torque of the wheel 90, and
an engine disconnect clutch 20 that connects the output shaft 14 to the input shaft 22 when placed in an engaged state, and disconnects the output shaft 14 from the input shaft 22 when placed in a released state, in which
the engine disconnect clutch 20 is a normally-open clutch that establishes the engaged state when oil is supplied thereto, and
when requested torque exceeds torque that can be generated by the electric motor 30 while the engine disconnect clutch 20 is in the released state, and the input shaft 22 is rotated by the electric motor 30 or by vehicle coasting, the oil starts to be supplied to the engine disconnect clutch 20 before a rotational speed of the engine 10 reaches a rotational speed of the input shaft 22.

In the structure described in (1), when requested torque exceeds torque that can be generated by the electric motor 30 while the engine disconnect clutch 20 is in the released state, and the input shaft 22 is rotated by the electric motor 30 or by the vehicle coasting, the oil starts to be supplied to the engine disconnect clutch 20 before the rotational speed of the engine 10 reaches the rotational speed of the input shaft 22. As a result, the racing of the engine rotation and the delay in transmission of the engine torque can be reduced.

(2) The controller 70 according to (1), in which the oil starts to be supplied to the engine disconnect clutch 20 so that the engine disconnect clutch 20 starts engaging when the rotational speed of the engine 10 reaches the rotational speed of the input shaft 22.

In the structure described in (2), the oil can start to be supplied to the engine disconnect clutch 20 so that the engine disconnect clutch 20 starts engaging when the rotational speed of the engine 10 reaches the rotational speed of the input shaft 22.

(3) The controller 70 according to (2), in which a time $\Delta T1$ required until the rotational speed of the engine 10 reaches the rotational speed of the input shaft 22 is calculated, and a predetermined hydraulic pressure command is issued based on a relation between the time $\Delta T1$ and an engine disconnect clutch hydraulic pressure response time $\Delta Tth$ that is a time after the predetermined hydraulic pressure command is issued until the engine disconnect clutch 20 starts engaging.

In the structure described in (3), the predetermined hydraulic pressure command is issued based on the relation between the time $\Delta T1$ and the engine disconnect clutch hydraulic pressure response time $\Delta Tth$. As a result, the predetermined hydraulic pressure command can easily be generated so that the engine disconnect clutch 20 starts engaging when the rotational speed of the engine 10 reaches the rotational speed of the input shaft 22. The predetermined hydraulic pressure command corresponds to a command for packing (final packing) of the engine disconnect clutch 20 and subsequent generation of the torque capacity, and corresponds to, for example, the hydraulic pressure command from time t2 in FIG. 3 (time t2 in FIG. 4).

(4) The controller 70 according to (3), in which the predetermined hydraulic pressure command is issued when the time $\Delta T1$ is equal to or shorter than the engine disconnect clutch hydraulic pressure response time $\Delta Tth$.

In the structure described in (4), the predetermined hydraulic pressure command can be issued at an appropriate time. As a result, the engine disconnect clutch 20 can more accurately start engaging when the rotational speed of the engine 10 reaches the rotational speed of the input shaft 22. In other words, the engine disconnect clutch 20 can more accurately start engaging when the time $\Delta T1$ reaches zero.

(5) The controller 70 according to (3) or (4), including an electric oil pump 52 that generates hydraulic pressure to be supplied to the engine disconnect clutch 20, in which a rotational speed of the electric oil pump 52 starts increasing before the predetermined hydraulic pressure command is issued.

In the structure described in (5), the electric oil pump can increase in advance the hydraulic pressure that can be supplied to the engine disconnect clutch 20. As a result, the engine disconnect clutch hydraulic pressure response time $\Delta Tth$ is accurately achieved.

(6) The controller 70 according to (5), in which, when the time $\Delta T1$ is equal to or shorter than an electric OP rotation rise start time $\Delta T2$ longer than the engine disconnect clutch hydraulic pressure response time $\Delta Tth$, the rotational speed of the electric oil pump 52 starts increasing to a predetermined rotational speed (predetermined rotation command value Rop) at which the engine disconnect clutch hydraulic pressure response time $\Delta Tth$ is achieved.

In the structure described in (6), the engine disconnect clutch hydraulic pressure response time ΔTth can be accurately achieved even when only low hydraulic pressure can be supplied to the engine disconnect clutch 20 before the rotational speed of the electric oil pump 52 is increased.

(7) The controller 70 according to (6), in which the electric OP rotation rise start time ΔT2 corresponds to a time after the rotational speed of the electric oil pump 52 starts increasing until the rotational speed of the electric oil pump 52 reaches the predetermined rotational speed (predetermined rotation command value Rop).

In the structure described in (7), the rotational speed of the electric oil pump 52 can reach the predetermined rotational speed (rotational speed corresponding to the predetermined rotation command value Rop) by the time when the time ΔT1 reaches zero.

(8) The controller 70 according to any one of (5) to (7), in which, when the time ΔT1 is equal to or shorter than a line pressure rise start time ΔT3 longer than the engine disconnect clutch hydraulic pressure response time ΔTth, line pressure starts increasing to the predetermined line pressure (predetermined line pressure command value $P_L$) at which the engine disconnect clutch hydraulic pressure response time ΔTth is achieved.

In the structure described in (8), the electric oil pump is used to increase the line pressure in advance so as to increase in advance the hydraulic pressure that can be supplied to the engine disconnect clutch 20. As a result, the engine disconnect clutch hydraulic pressure response time ΔTth is accurately achieved.

(9) The controller 70 according to (8), in which the line pressure rise start time ΔT3 corresponds to a time after the line pressure starts increasing until the line pressure reaches the predetermined line pressure (predetermined line pressure command value $P_L$).

In the structure described in (9), the line pressure can reach the predetermined line pressure (predetermined line pressure command value $P_L$) by the time when the time ΔT1 reaches zero.

(10) The controller 70 according to any one of (1) to (9), in which, under a condition in which the rotational speed of the input shaft 22 is equal to or higher than a predetermined rotational speed at which the engine 10 is capable of autonomously rotating, the oil starts to be supplied to the engine disconnect clutch 20 before the rotational speed of the engine 10 reaches the rotational speed of the input shaft 22.

In the structure described in (10), the frequency of what is called the engine stall in which the engine 10 fails to autonomously rotate can be reduced when the engine disconnect clutch 20 is brought into the engaged state.

(11) The controller 70 according to any one of (1) to (10), in which
the input shaft 22 is connected to a front wheel 90 or a rear wheel 92, and
the electric motor 30 is connected to the input shaft 22 or a wheel not connected to the input shaft 22.

(12) A controller 70 for a vehicle drive apparatus 1 or 2, the vehicle drive apparatus 1 or 2 including:
an output shaft 14 connected to an engine 10,
an input shaft 22 connected to a wheel 90,
an electric motor 30 that generates rotational torque of the wheel 90, and
an engine disconnect clutch 20 that connects the output shaft 14 to the input shaft 22 when placed in an engaged state, and disconnects the output shaft 14 from the input shaft 22 when placed in a released state, in which the engine disconnect clutch 20 is a normally-closed clutch that establishes the engaged state when oil is discharged therefrom, and
when requested torque exceeds torque that can be generated by the electric motor 30 while the engine disconnect clutch 20 is in the released state, and the input shaft is rotated by the electric motor 30 or by vehicle coasting, the oil starts to be discharged from the engine disconnect clutch 20 before a rotational speed of the engine reaches a rotational speed of the input shaft.

In the structure described in (12), the same effect as that of (1) described above can be obtained when the engine disconnect clutch 20 for disconnection is a normally-closed clutch.

The invention claimed is:

1. A control device for a vehicle drive apparatus, the vehicle drive apparatus comprising:
an output shaft connected to an engine;
an input shaft connected to a wheel;
an electric motor that generates rotational torque of the wheel; and
a hydraulic clutch that connects the output shaft to the input shaft when placed in an engaged state, and disconnects the output shaft from the input shaft when placed in a released state, wherein
the hydraulic clutch is a normally-open clutch that establishes the engaged state when oil is supplied thereto,
when requested torque exceeds torque that can be generated by the electric motor while the hydraulic clutch is in the released state, and the input shaft is rotated by the electric motor or by vehicle coasting, the oil starts to be supplied to the hydraulic clutch before a rotational speed of the engine reaches a rotational speed of the input shaft, and
the oil starts to be supplied to the hydraulic clutch so that the hydraulic clutch starts engaging and a torque capacity of the hydraulic clutch is raised from zero when the rotational speed of the engine reaches the rotational speed of the input shaft.

2. The control device according to claim 1, wherein a first time required for the rotational speed of the engine to reach the rotational speed of the input shaft is calculated, and a predetermined hydraulic pressure command is issued based on a relation between the first time and a hydraulic pressure response time that is a time after the predetermined hydraulic pressure command is issued until the hydraulic clutch starts engaging.

3. The control device according to claim 2, wherein the predetermined hydraulic pressure command is issued when the first time is equal to or shorter than the hydraulic pressure response time.

4. The control device according to claim 2 comprising an electric oil pump that generates hydraulic pressure to be supplied to the hydraulic clutch, wherein
a rotational speed of the electric oil pump starts increasing before the predetermined hydraulic pressure command is issued.

5. The control device according to claim 4, wherein when the first time is equal to or shorter than a second time longer than the hydraulic pressure response time, the rotational speed of the electric oil pump starts increasing to a predetermined rotational speed at which the hydraulic pressure response time is achieved.

6. The control device according to claim 5, wherein the second time corresponds to a time after the rotational speed of the electric oil pump starts increasing until the rotational speed of the electric oil pump reaches the predetermined rotational speed.

7. The control device according to claim 4, wherein when the first time is equal to or shorter than a third time longer than the hydraulic pressure response time, line pressure starts increasing to predetermined line pressure at which the hydraulic pressure response time is achieved.

8. The control device according to claim 7, wherein the third time corresponds to a time after the line pressure starts increasing until the line pressure reaches the predetermined line pressure.

9. The control device according to claim 5, wherein when the first time is equal to or shorter than a third time longer than the hydraulic pressure response time, line pressure starts increasing to predetermined line pressure at which the hydraulic pressure response time is achieved.

10. The control device according to claim 6, wherein when the first time is equal to or shorter than a third time longer than the hydraulic pressure response time, line pressure starts increasing to predetermined line pressure at which the hydraulic pressure response time is achieved.

11. The control device according to claim 1, wherein
under a condition in which the rotational speed of the input shaft is equal to or higher than a predetermined rotational speed at which the engine is capable of autonomously rotating, the oil starts to be supplied to the hydraulic clutch before the rotational speed of the engine reaches the rotational speed of the input shaft.

12. The control device according to claim 1, wherein
the input shaft is connected to a front wheel or a rear wheel, and
the electric motor is connected to the input shaft or a wheel not connected to the input shaft.

13. The control device according to claim 3, comprising an electric oil pump that generates hydraulic pressure to be supplied to the hydraulic clutch, wherein
a rotational speed of the electric oil pump starts increasing before the predetermined hydraulic pressure command is issued.

14. The control device according to claim 13, wherein when the first time is equal to or shorter than a second time longer than the hydraulic pressure response time, the rotational speed of the electric oil pump starts increasing to a predetermined rotational speed at which the hydraulic pressure response time is achieved.

15. The control device according to claim 14, wherein the second time corresponds to a time after the rotational speed of the electric oil pump starts increasing until the rotational speed of the electric oil pump reaches the predetermined rotational speed.

16. The control device according to claim 15, wherein when the first time is equal to or shorter than a third time longer than the hydraulic pressure response time, line pressure starts increasing to predetermined line pressure at which the hydraulic pressure response time is achieved.

17. The control device according to claim 14, wherein when the first time is equal to or shorter than a third time longer than the hydraulic pressure response time, line pressure starts increasing to predetermined line pressure at which the hydraulic pressure response time is achieved.

18. The control device according to claim 13, wherein when the first time is equal to or shorter than a third time longer than the hydraulic pressure response time, line pressure starts increasing to predetermined line pressure at which the hydraulic pressure response time is achieved.

19. A control device for a vehicle drive apparatus, the vehicle drive apparatus comprising:
an output shaft connected to an engine,
an input shaft connected to a wheel,
an electric motor that generates rotational torque of the wheel, and
a hydraulic clutch that connects the output shaft to the input shaft when placed in an engaged state, and disconnects the output shaft from the input shaft when placed in a released state, wherein
the hydraulic clutch is a normally-closed clutch that establishes the engaged state when oil is discharged therefrom,
when requested torque exceeds torque that can be generated by the electric motor while the hydraulic clutch is in the released state, and the input shaft is rotated by the electric motor or by vehicle coasting, the oil starts to be discharged from the hydraulic clutch before a rotational speed of the engine reaches a rotational speed of the input shaft, and
the oil starts to be discharged from the hydraulic clutch so that the hydraulic clutch starts engaging and a torque capacity of the hydraulic clutch is raised from zero when the rotational speed of the engine reaches the rotational speed of the input shaft.

* * * * *